United States Patent [19]
Simpson

[11] Patent Number: 5,957,476
[45] Date of Patent: Sep. 28, 1999

[54] ANTI-JACKKNIFE SYSTEM FOR TRACTOR-TRAILERS

[76] Inventor: William A. Simpson, 7241 Yolanda Ave., Reseda, Calif. 91335

[21] Appl. No.: 08/803,432

[22] Filed: Feb. 20, 1997

Related U.S. Application Data

[60] Provisional application No. 60/012,415, Feb. 28, 1996.
[51] Int. Cl.⁶ ........................................... B60T 7/12
[52] U.S. Cl. ..................... 280/432; 280/455.1; 280/446.1
[58] Field of Search .................................. 280/432, 747, 280/455.1, 445, 448, 446.1

[56] References Cited

U.S. PATENT DOCUMENTS

| | | | |
|---|---|---|---|
| 2,709,088 | 5/1955 | Orbits ........................................ | 280/432 |
| 3,850,449 | 11/1974 | Link et al. ................................ | 280/432 |
| 4,313,616 | 2/1982 | Howard ..................................... | 280/432 |
| 4,344,640 | 8/1982 | Ratsko et al. ............................ | 280/432 |
| 4,366,966 | 1/1983 | Ratsko et al. ............................ | 280/432 |
| 4,402,522 | 9/1983 | Ratsko et al. ............................ | 280/432 |
| 4,469,347 | 9/1984 | Gier .......................................... | 280/432 |
| 4,616,841 | 10/1986 | Reichl et al. ............................. | 280/432 |
| 4,620,717 | 11/1986 | Ivony et al. .............................. | 280/432 |
| 4,688,818 | 8/1987 | Grassmuck ................................ | 280/432 |
| 4,706,984 | 11/1987 | Esler et al. ............................... | 280/432 |
| 4,720,118 | 1/1988 | Schultz et al. ............................ | 280/432 |
| 4,756,543 | 7/1988 | Cromnow et al. ........................ | 280/432 |
| 4,934,727 | 6/1990 | Hawkins ................................... | 280/432 |
| 5,137,107 | 8/1992 | Uttenthaler ............................... | 280/432 |
| 5,174,597 | 12/1992 | Uttenthaler ............................... | 280/432 |

*Primary Examiner*—Daniel G. DePumpo

[57] ABSTRACT

This machine provides back-up steering for a tractor-trailer when the conventional steering fails. The steering will fail due to a lack of interface bonding between the front tires and the road during turning and braking. This machine is constructed around a piston-cylinder connected between the tractor and trailer. The cylinder end pivots on the tractor. The piston rod end is connected through a pivot and a link to the trailer. This machine contains a high pressure pump in the fluid circuit. A pneumatically powered machine is shown in the patent specification. The pneumatically powered machine closely resembles the hydraulic machine. The driver controls the anti-jackknife machine through the driver control switch. When the conventional steering fails during turning and braking of the vehicle, the driver will sense the "spin" of the tractor and he will close the driver control switch. The energized anti-jackknife system will then bring the tractor back toward the straight ahead position to a heading desired by the driver. More powerful electric solenoid-plunger machines are in the design stage. These machines, when developed, might prove to be an ideal link between tractor and trailer. They provide:

1. a free moving plunger when de-energized
2. a strong pull-back plunger action when energized

2 Claims, 2 Drawing Sheets

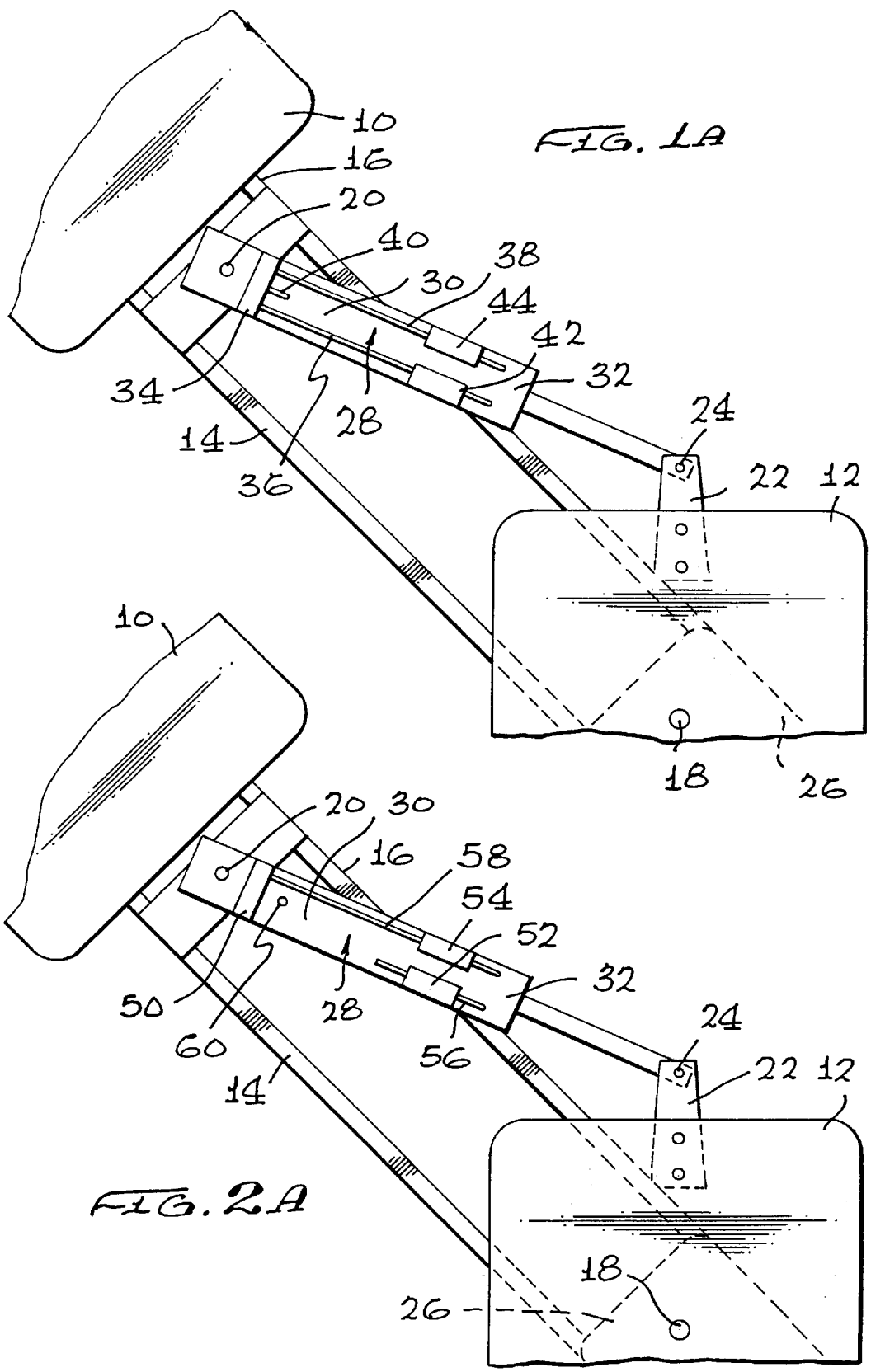

ANTI-JACKKNIFE SYSTEM FOR TRACTOR-TRAILERS

This invention is described in Provisional Application No. 60/012,415, filed Feb. 28, 1996.

BACKGROUND OF INVENTION

1. Technical Field.

This invention relates to articulated vehicles. The object of this invention is to prevent instability, loss of control and jackknifing of tractor trailers. These heavy vehicles are commonly referred to as "18 wheelers" and "Big Rigs".

2. Background Art

The following related art patents were reviewed:

U.S. Pat. No. 3,850,449
U.S. Pat. No. 2,709,088
U.S. Pat. No. 4,620,717
U.S. Pat. No. 4,344,640
U.S. Pat. No. 4,366,966
U.S. Pat. No. 4,720,118
U.S. Pat. No. 4,313,616
U.S. Pat. No. 4,706,984
U.S. Pat. No. 4,934,727
U.S. Pat. No. 4,469,347
U.S. Pat. No. 5,174,597
U.S. Pat. No. 4,756,543
U.S. Pat. No. 4,616,841
U.S. Pat. No. 4,688,818
U.S. Pat. No. 5,137,107
U.S. Pat. No. 4,402,522

These patents describe anti-jackknife machines that provide for a damping system or a locked system to slow or stop excessive angular movement between the tractor and trailer.

These machines do not contain a high pressure pump in their design. This limits them to slowing or stopping the excessive angular movement between a tractor and trailer.

These machines would not have the ability to bring the tractor back in toward the center line of the rig and into the heading desired by the driver.

The anti-jackknife system presented in this application accomplishes it's purpose by providing a backup to the conventional steering. The conventional steering will fail when there is a lack of interface bonding between the front tires and the road during turning and braking.

To provide the steering backup, a high pressure pump is installed in the fluid circuit of this anti-jackknife machine.

This hydrodynamic anti-jackknife system will not only stop the "spin" of the tractor but it will apply the force necessary to bring the tractor back toward the straight ahead position and into the heading desired by the driver.

SUMMARY

The hydrodynamic and pneumatic anti-jackknife machines are designed to stop the "spin" of a tractor during turning and braking and to pull it back in toward the straight ahead position.

The out of control "spin" of a tractor will occur when the interface bonding between the tractor tires and the road is not sufficient to counteract the rotational force encountered in turning and braking. A rain-slick roadway, snow and ice are particularly hazardous.

The anti-jackknife machines generate a countervailing force to the rotational or "spin" force that the tractor experiences in turning and braking.

The anti-jackknife machine is for use only in emergency situations when the conventional steering fails. The vast majority of the time the driver control switch is open and the anti-jackknife machine is de-energized. The machine then simply "floats" between the tractor and trailer. The piston will move freely with changes in the heading of the tractor.

As the tractor moves out from the straight ahead position in a left or right turn, the piston will move toward the rear of the cylinder.

As the turn is completed and the tractor moves in toward the straight ahead position, the piston will move toward the front of the cylinder.

Thus, the anti-jackknife machine rides between the cab and the trailer ready in an instant to take over the reins of 400 wild horses.

ILLUSTRATION FIGURES

In this proposal to solve the problem of instability, loss of control and jackknifing, the hydrodynamic machine shown in FIG. 1 and FIG. 1A is the preferred embodiment of the invention.

A second embodiment is shown in FIG. 2 and FIG. 2A. This machine is pneumatically driven.

The preferred hydrodynamic machine will be described first, followed by a description of the pneumanic machine.

FIG. 1A shows the same machine with the tractor turning left.

FIG. 2A shows the same machine with the tractor turning left.

Figure 1:
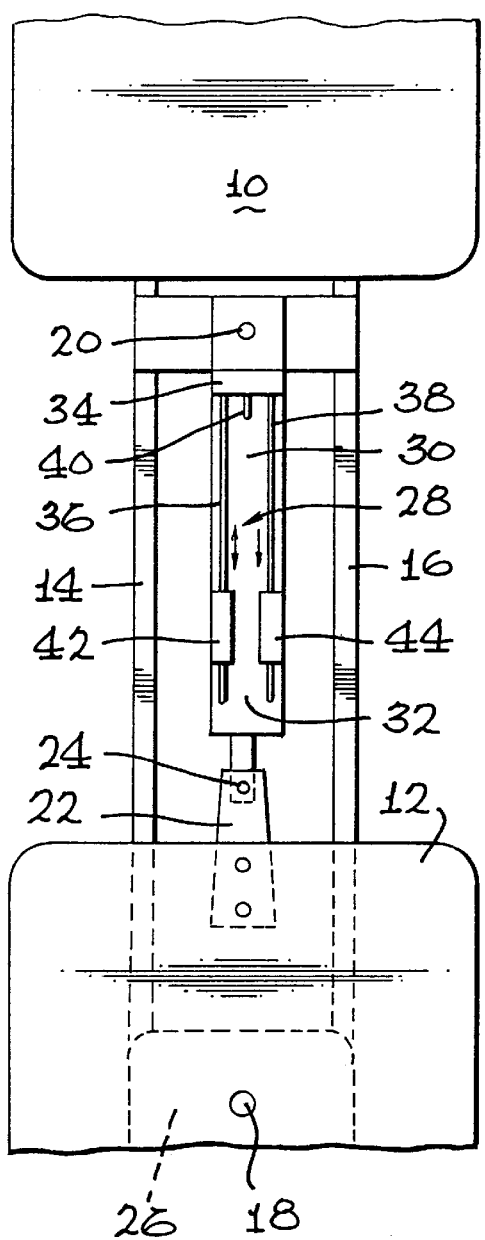
FIG. 1 shows the preferred hydrodynamic embodiment of the anti-jackknife machine. This machine is mounted on a tractor-trailer in the straight ahead position.

FIG. 1 and FIG. 1A will be described first, followed by a description of FIG. 2 and FIG. 2A Reference numerals in illustrations FIG. 1, and FIG. 1A—Hydrodynamic machine.

10 rear of tractor cab
12 front section of trailer
14 tractor frame—left side
16 tractor frame—right side
18 trailer pin
20 tractor pivot—This pivot is supported by a frame cross member. The pivot is part of a universal joint connection between the tractor and the end of the cylinder.
22 trailer to piston rod link—This link extends from the front of the trailer to the piston rod end. This link is secured to the front of the trailer by 2 bolts. The front end of the link contains a pivot 24, which is part of a universal joint connection between the link and the piston rod end.
24 trailer to piston rod link - pivot.
26 conventional 5th wheel
28 cylinder piston assembly
30 front chamber of cylinder piston assembly
32 rear chamber of cylinder piston assembly
34 hydraulic reservoir
36 left hydraulic line—The flow in this line is in either direction.
38 right hydraulic line—The flow in this line is unidirectional, front to rear.

40 reservoir to front chamber hydraulic line—The flow in this line is in either direction.

42 electric valve—when energized through the driver control switch, this valve closes.

44 high pressure pump with check valve—when energized through the driver control switch, this pump delivers 2000 P.S.I. oil to the rear chamber 32 of the cylinder-piston assembly 28.

DESCRIPTION FIG. 1 AND FIG. 1A

This is the description of the hydrodynamic machine which is the preferred embodiment of the invention.

FIG. 1 and FIG. 1A are illustrations of a schematic model of the hydrodynamic machine mount on a tractor-trailer.

The numerical parts list provides a brief description of each part. However, it might be of help to describe some of the parts in greater detail.

12 Front section of Trailer—This is represented in the model by a piece of clear plastic. The center part is transparent so that the conventional 5th wheel 26 and the trailer to piston rod link 22 can be viewed. The sides of the clear plastic piece are covered. The 8 rear tractor wheels normally located near the 5th wheel 26 are not shown.

20 Tractor pivot—A universal joint connection is necessary here to allow for the ever changing horizontal and vertical angular relationship between the tractor and the trailer.

24 Trailer to piston Rod Link, pivot—This pivot is part of a universal joint connection between the trailer to piston rod link and the end of the piston rod.

28 Cylinder-piston Assembly—This is the centerpiece of the anti-jackknife system. The hydraulic ram has served for decades in the control mechanisms of earth moving equipment, aircraft, and boats.

36 Left Hydraulic Line—This line extends from the hydraulic reservoir 34, through the electric valve 42 and into the rear chamber 32 of the cylinder-piston assembly 28.

38 Right Hydraulic Line—This line extends from the hydraulic reservoir 34, through the high pressure pump with check valve 44 and into the rear chamber 32 of the cylinder - piston assembly 28. The flow in this line is unidirectional from front to rear. The pump with check valve 44 blocks any reverse flow.

40 Reservoir to Front Chamber Hydraulic Line—Flow in this line is in either direction. The hydraulic reservoir 34 and the front chamber 30 of the cylinder-piston assembly 28 function as one vessel.

42 Electric Valve—Closed when energized.

44 High pressure pump with check valve—when the anti-jackknife machine is energized by closing the driver control switch, the electric valve 42 and the high pressure pump with check valve 44 are energized simultaneously. The electric valve 42 c lo ses and blocks oil flow out of the rear chamber 32 of t he cylinder-piston assembly 28. The high pressure pump 44 delivers oil at 2000 P.S.I. to the rear chamber 32 of the cylinder piston assembly 28. This provides the force which actuates the anti-jackknife system.

OPERATION FIG. 1 AND FIG. 1A

The operational description of the preferred hydrodynamic anti-jackknife machine utilizes the FIG. 1A with the tractor in the left turn position.

With the tractor in the left turn position, the driver is assumed to have made a hard left turn with maximum braking in order to avoid a slow moving vehicle. This sets up a counterclockwise rotational force on the tractor.

After the driver has avoided the slow moving vehicle, he then turns the steering wheel back to the right and finds that the heading of the tractor is not responding to the steering. The tractor is in a "spin", unstable, out of control and moving toward the jackknife.

The driver immediately closes the driver control switch. This stops the counterclockwise "spin" of the tractor and provides a powerful force to pull the tractor back in toward the straight ahead position.

The closing of the driver control switch energizes the electric valve 42 and the high pressure pump 44 simultaneously. The electric valve 42 closes and blocks the oil flow out of the rear chamber 32 of the cylinder-piston assembly 28. The high pressure pump 44 now delivers 2000 P.S.I. oil into the rear chamber 32 of the cylinder-piston assembly 28.

The closing of the electric valve 42 prevents the tractor from "spinning" further outward away from the straight ahead position.

The energizing of the high pressure pump 44 provides 2000 P.S.I. pressure against the piston. This pressure against the piston generates the force to pull the tractor back in toward the straight ahead position.

DESCRIPTION FIG. 2 AND FIG. 2A

This is the pneumatic embodiment of the anti-jackknife machine.

This machine is powered by air and is very similar to the hydrodynamic machine powered by oil.

The pneumatic machine does not provide a positive coupling between the tractor and trailer as does the hydrodynamic machine. However, it is capable of generating a powerful anti-jackknife force.

Figure 2:
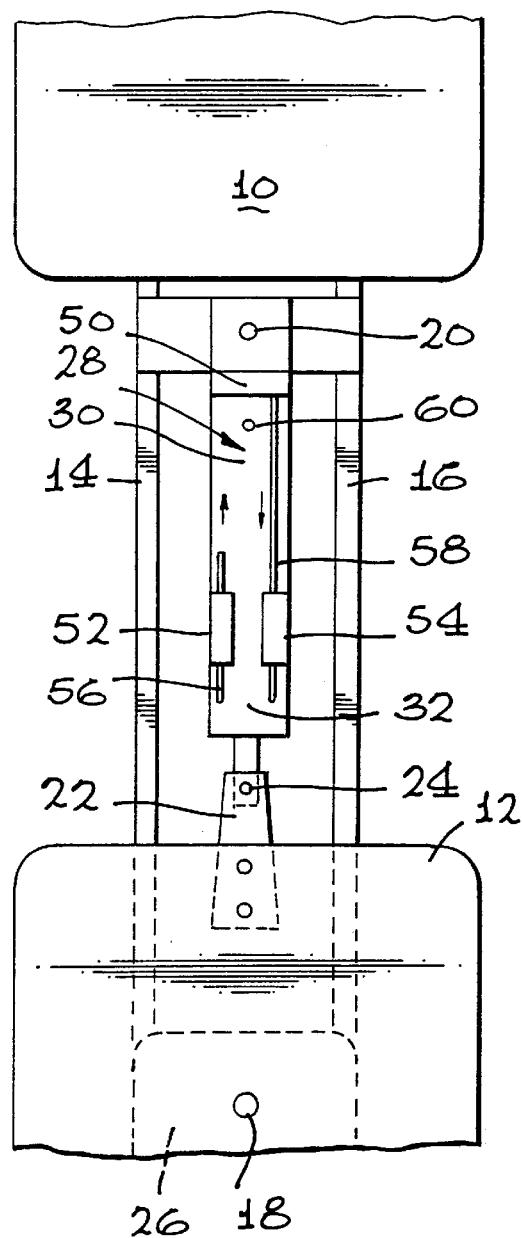
FIG. 2 shows the pneumatic embodiment of the anti-jackknife machine. This air driven machine is mount on a tractor-trailer in the straight ahead position.

The listing of the numerical parts along with FIG. 2 and FIG. 2A should provide an adequate description of the construction of the pneumatic machine.

Reference numerals in illustrations FIG. 2 and FIG. 2A—Pneumatic Machine 10 rear of tractor cab.
12 front section of trailer
14 tractor frame—left side
16 tractor frame—right side
18 trailer pin
20 tractor pivot
22 trailer to piston rod link
24 trailer to piston rod link, pivot
26 conventional 5th wheel
28 cylinder-piston assembly
30 front chamber of cylinder-piston assembly
32 rear chamber of cylinder-piston assembly
50 high pressure air reservoir
52 electric valve—This valve is closed when energized through the driver control switch. This valve when closed, prevents air flow out of the rear chamber 32 of the cylinder-piston assembly 28.
54 electric valve—This valve is open when energized through the driver control switch. This valve controls the flow of high pressure air into the rear chamber 32 of the cylinder-piston assembly 28.

56 left air line—The flow in this line is out of the rear chamber 32 of the cylinder-piston assembly 28, through the electric valve 52 and into the atmosphere.

58 right air line—The flow in this line is from front to rear. Air flows from the high pressure air reservoir 50, through the electric valve 54 and into the rear chamber 32 of the cylinder-piston assembly 28.

60 air vent—this line vents the front chamber 30 of the cylinder-piston assembly 28 into the atmosphere. The front chamber 30 is always at atmospheric pressure.

OPERATION FIG. 2 AND FIG. 2A

The operational description of the pneumatic anti-jackknife machine utilizes the FIG. 2A with the actor in the left turn position.

The assumption again being that the tractor is in a "spin" situation similar to that described in FIG. 1A The closing of the driver control switch energizes the electric valve 52 and the electric valve 54 simultaneously. The electric valve 52 closes. The electric valve 54 opens.

When the electric valve 52 closes, air is prevented from leaving the rear chamber 32 of the cylinder-piston assembly 28.

When the electric valve 54 opens, high pressure air is supplied from the reservoir 50 into the rear chamber 32 of the cylinder-piston assembly 28.

With high pressure air in the rear chamber 32 acting on the piston, a force is generated in the cylinder-piston assembly 28. This force tends to pull the tractor in toward the straight ahead position.

I claim:

1. The combination of an anti-jackknife system and a tractor-trailer, comprising:
    a) a machine connected between said tractor-trailer for enabling said machine, when energized, to produce a countervailing force to the force precipitating the jackknife of said tractor,
    b) an energy source and
    c) means for controllably applying energy to said machine, whereby providing backup steering for said tractor-trailer, thus avoiding the jackknife.

2. The machine of claim 1 wherein said machine comprises:
    a) a cylinder-piston
    b) means for generating and delivering high pressure fluid to said cylinder-piston.

* * * * *